June 3, 1952  C. H. YOUNGBERG  2,598,959
ANGLING MEANS FOR DISK HARROWS
Filed Oct. 8, 1945  3 Sheets-Sheet 1
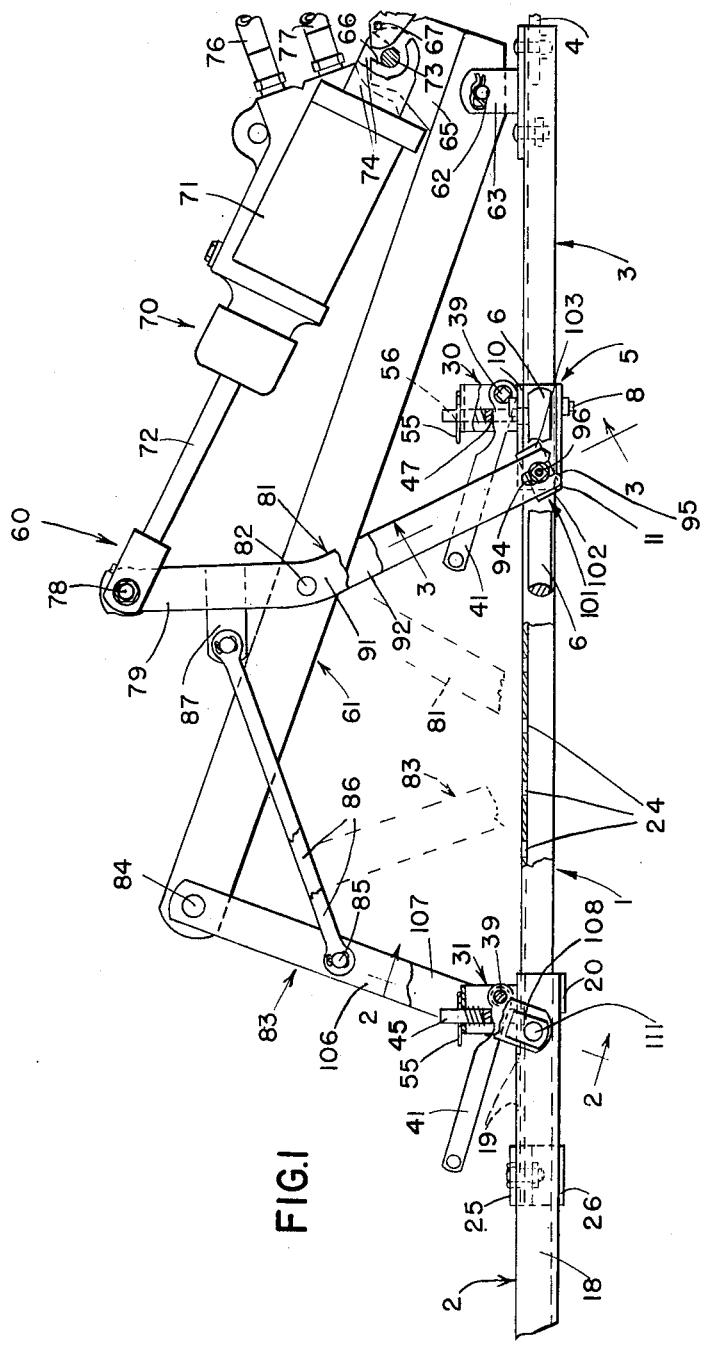
FIG.1
INVENTOR.
CHARLES H. YOUNGBERG
ATTORNEYS.

June 3, 1952  C. H. YOUNGBERG  2,598,959
ANGLING MEANS FOR DISK HARROWS
Filed Oct. 8, 1945  3 Sheets-Sheet 2
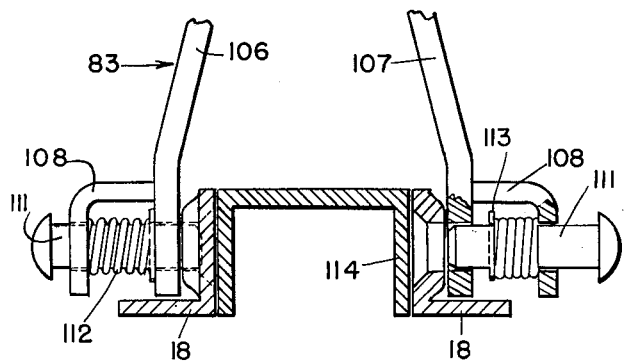
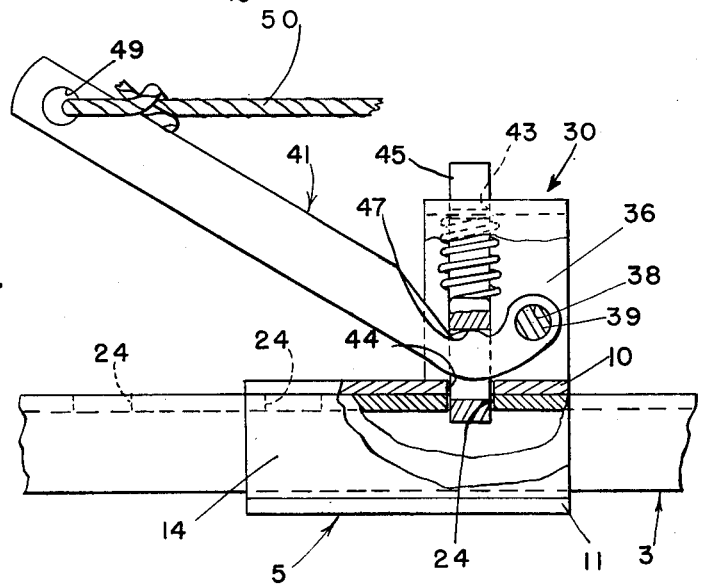
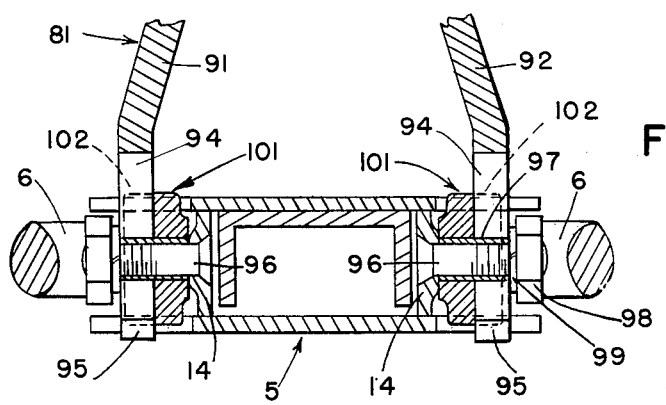
INVENTOR.
CHARLES H. YOUNGBERG
BY
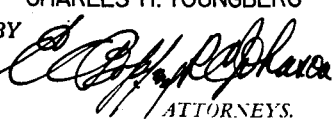
ATTORNEYS.

June 3, 1952   C. H. YOUNGBERG   2,598,959
ANGLING MEANS FOR DISK HARROWS
Filed Oct. 8, 1945   3 Sheets-Sheet 3
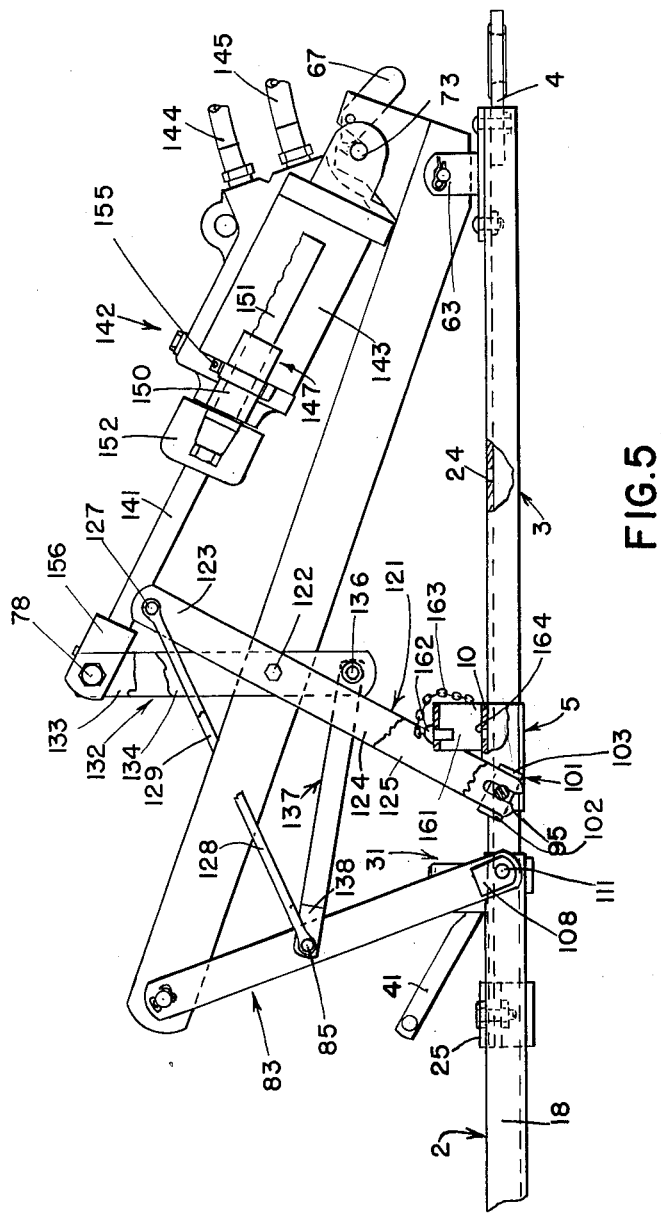
FIG.5
INVENTOR.
CHARLES H. YOUNGBERG
BY
ATTORNEYS.

Patented June 3, 1952

2,598,959

UNITED STATES PATENT OFFICE 2,598,959

ANGLING MEANS FOR DISK HARROWS

Charles H. Youngberg, Moline, Ill., assignor to Deere & Company, Moline, Ill., a corporation of Illinois Application October 8, 1945, Serial No. 620,951

12 Claims. (Cl. 55—83)

1

The present invention relates generally to agricultural implements and more particularly to disk harrows.

The object and general nature of the present invention is the provision of means for straightening and angling the disk gang or gangs of the harrow, either manually, or by means of a detachable power operated mechanism. More particularly, it is a feature of this invention to provide a detachable power operated mechanism which, when attached to the harrow and connected to swing the gang or gangs between their straightened and angled positions, does not impose undue stresses on any of the disk harrow parts, particularly the drawbar or hitch construction thereof.

More specifically, it is an important feature of this invention to provide a power angling attachment for disk harrows and the like in which a rigid supporting beam is provided to take the principal part of the stresses involved in angling and straightening the disk gang, thereby relieving the disk harrow parts of any abnormal loads.

A further feature of this invention is the provision of a new and improved latch means especially constructed to accommodate the manual control of the harrow when the power unit is detached and to accommodate with ample clearance the parts of the power unit when the latter is attached to the harrow to angle the gang or gangs thereof by power.

These and other objects and advantages of the present invention will be apparent to those skilled in the art after a consideration of the following detailed description, taken in conjunction with the accompanying drawings in which two forms of the present invention have been shown by way of illustration.

In the drawings:

Figure 1 is a side view of the drawbar construction of a disk harrow and my improved power control attachment mounted in place thereon.

Figure 2 is a view taken generally along the line 2—2 of Figure 1.

Figure 3 is a view taken along the line 3—3 of Figure 1.

Figure 4 is a side view of the improved drawbar latch unit.

Figure 5 is a view similar to Figure 1, showing a modified form of the present invention.

Referring now to the drawings, particularly Figure 1, the drawbar or hitch construction of the disk harrow is indicated in its entirety by the reference numeral 1 and comprises a rear member 2, a forward member 3, which is adapted to receive draft as from a propelling tractor (not shown) connected by a hitch plate 4 to the front end of the drawbar member 3, and a slide 5 movably mounted on the forward drawbar member 3. By virtue of this construction, the propelling force exerted by the tractor in operation is transmitted from the member 4 to the harrow. The disk harrow, of which the drawbar construction 1 is a part, is of conventional construction and hence has not been illustrated. It will be understood, however, that the disk harrow includes one or more disk gangs swingable in a generally horizontal plane, with one end portion of each disk gang connected with one of the drawbar members, and the other end portion of each gang connected with the drawbar slide member 5. Specifically, in one form of the invention, the disk harrow comprises two disk gangs, the inner ends of which are connected with the rear portion of the rear drawbar member 2 while the outer end portions of the two disk gangs are connected through draft rods 6 with the slide member 5, as by bolts 8. The slide member 5 comprises upper and lower plates 10 and 11, which are formed with upper and lower apertured ears receiving the pivot bolts 8. The upper and lower plates 10 and 11 are connected together by side plates 14 welded or otherwise secured thereto. The rear drawbar member 2 preferably comprises a pair of angles 18 suitably connected together at their forward ends by cross plates 19 and 20 between which the rear end of the forward drawbar member 3 extends. The latter member preferably is in the form of a channel having a number of slots or notches 24 therein, and the rear end of the channel member 3 has bolted thereto upper and lower plates 25 and 26 which limit the forward movement of the drawbar member 3 relative to the rear drawbar member 2. The rearward end plate 19 on the rear drawbar member 2 serves as a stop cooperating with the plate 25 to limit the extended position of the drawbar members 2 and 3, as aforesaid.

The slide member 5 and the forward end of the rear drawbar member 2 carry latch units 30 and 31. These latch units are preferably identical, and hence a description of the forward latch unit 30 will suffice. Secured to the plate 10 is an inverted U-shaped part 36 which serves as a bracket carried by the plate 10. The bracket 36 is apertured, as at 38, to receive a pivot member 39, such as a bolt or bushing, to which the forward end of a latch lever 41 is connected. The plate 10 and the upper part of the bracket 36 are apertured, as at 43 and 44, respectively, and receive a vertically reciprocable latching plunger 45, the lower end of which is adapted to be projected below the opening 43 and into one of the notches 24 of the channel drawbar member 3. A relatively large opening 47 is formed in the latch plunger 45, and through this opening the lever 41 extends. The opening 47 is appreciably larger than the cooperating portion of the trip lever 41 so that the latter has a certain amount of lost motion therein, the purpose of which will be explained later. The outer end of the trip lever 41 is apertured, as at 49, to receive a cable, rope or the like, as indicated at 50. When it is desired to lock the plunger 45 in an inoperative position, in which the lower end of the plunger is not permitted to engage the drawbar channel 3, a quick detachable hair pin connector 55 is inserted through an opening 56 in the upper end of the plunger, when the latter is lifted by the lever 41 into its inoperative position, and this holds the plunger in an upper position, as shown in Figure 1. However, due to the lost motion between the lever 41 and the opening 47, the trip lever 41 is permitted to occupy a relatively low down position with respect to the drawbar proper, whereby the trip lever 41 will not interfere with any of the adjacent parts of the power angling control attachment when it is installed on the harrow. Preferably, although not necessarily, when the power control attachment is installed the cables 50 are removed. Both of the latch units 30 and 31 are constructed as described above, and when the power control attachment to be described below in detail is removed from the harrow, the two cables 50 of the latching units 30 and 31 are extended forwardly to the operator's station on the tractor and thus provide means for manually controlling the disk harrow in a manner well known to those skilled in the art.

Considering now the power control attachment, the same is indicated in its entirety by the reference numeral 60 and comprises a rigid supporting member 61, preferably in the form of a relatively heavy bar, which is pivotally connected, as at 62, to a pair of angle brackets 63 that form a permanent part of the drawbar channel 3, being fixed to the front end thereof by rivets or bolts, as shown in Figure 1. The front end of the bar or support 61 is provided with a cylinder-receiving bracket 65, notched, as at 66, and provided with a cylinder retaining detent 67. The cylinder, just mentioned, forms a part of a hydraulic ram unit indicated in its entirety by the reference numeral 70 and, in general, comprises a cylinder 71 and a piston connected to the inner end of a piston rod 72 that extends outwardly of the cylinder 71. The latter is provided with a pin 73 that is carried by a pair of apertured ears 74, and the pin is adapted to seat in the notch 66. The hydraulic unit 70 is of the double acting type and two hose lines 76 and 77 lead from the cylinder 71 to a control valve and hydraulic unit (not shown) mounted on the tractor. Normally, the hydraulic unit 70 also forms a normally permanent part of the tractor since the hose lines 76 and 77 are in general not ordinarily disconnected. The end of the piston rod 72 carries a quick detachable pin 78 by which the hydraulic unit 70 is connected to the upper end 79 of a swinging arm or lever 81 that is pivoted, at 82, to the support bar 61. A second swinging arm or lever 83 is pivoted, at 84, to the rear end of the support bar 61 and is connected at a midpoint, as at 85, to a pair of links 86. The arm or lever 83 is connected by said pair of links 86 to a bracket 87 formed on or carried by the upper end 79 of the forward swinging arm or lever 81.

The arm or lever 81 comprises two strap members 91 and 92, the upper ends of which are spaced apart to receive the support bar 61 therebetween. The lower end portions of the strap members 91 and 92 diverge downwardly and are provided with slots 94 open at their lower ends, and tapered or flared outwardly, as at 95. The slide member 5 has each of its side plates 14 formed to receive the inner squared head ends of a pair of pivot bolts 96. Each of these bolts extend laterally outwardly through a bushing 97, and a nut and washer 98 and 99 are mounted on the outer end of each bolt 96. Also mounted on each bolt 96 is a slide casting 101 apertured to receive the associated bolt and provided with guide flanges 102 and 103 spaced apart to receive the lower slotted end of the associated strap member, 91 or 92, therebetween. The slide castings 101 are thus pivoted on the associated pivot bolt 96, and the length of the bushing 97 is such that the lower end of the associated strap member, 91 or 92, is freely slidable in a generally vertical direction in the associated member 101.

The rear swinging arm member or lever 83 comprises a pair of straps 106 and 107, also flaring outwardly at the lower ends which are apertured. The lower end of each of the strap members 106 and 107 is formed with an angled extension 108, also apertured, and each angled extension 108 forms with the associated strap member a bifurcated section, the apertures of which are in axial alignment and in which a spring biased quick detachable pin member 111 is disposed. As best shown in Figure 2, each pin 111 is slidably mounted in the associated apertures and, in the space between the extension 108 and the lower end of the associated strap a biasing spring 112 is disposed. The inner end of each spring 112 acts against a cotter 113 which passes through an opening in the inner end of the associated pin 111. The forward end portions of the angles 18 making up the drawbar member 2 are formed with apertures 114 to receive the associated quick detachable pivot pins 111. By pulling the two pins 111 outwardly against the action of the associated springs 112, the rear swinging arm or lever 83 of the power control attachment may readily be connected to or disconnected from the forward end of the rear drawbar member 2. The forward swinging arm or lever 81 may be connected to or disconnected from its associated pivots on the slide 5 by merely raising or lowering the lower end of the arm or lever 81. The forward pivot 62, which supports the forward end of the bar 61, may readily be detached by removing the hair pin connector and sliding the pin 62 free of the brackets 63.

The operation of the power control attachment as described above is substantially as follows.

After first shifting each of the latch plungers 45 into their unlatched position and holding them in that position by the detachable pins 55, the power control attachment is mounted in position on the disk harrow drawbar by connecting the rear swinging arm or lever 83 in position with the quick detachable pins 111, and by sliding the lower ends of the strap members 91 and 92 in position in the slide castings 101 and connecting the forward end of the support bar 61 by the pivot pin 62 to the front end of the drawbar channel member 3. By controlling the amount of fluid directed into the ram unit 70, the angling and deangling of the harrow is readily controlled. As shown in Figure 1, the relatively shiftable members 2 and 5 are in their separated position, which swings the gangs into their maximum angled position. If it should be desired to reduce the angle, all that it is necessary to do is to operate the hydraulic ram unit 70 so as to bring the lower ends of the arms or levers 81 and 83 somewhat closer together, moving the member 2 and the member 5 relative to the drawbar channel 3 to which the propelling tractor is connected. This reduces the angle to the desired point. When it is desired to bring the disk harrow into its straightened position, as for transport, the arms or levers 81 and 83 are operated to swing the lower ends together, it being noted that one moves rearwardly while the other moves forwardly, relative to the channel 3, substantially into the positions shown in dotted lines in Figure 1.

When it is desired to operate the harrow manually, as may be necessary if the tractor to which it is connected is not equipped with a power cylinder, such as the hydraulic unit 70, the pins 55 are removed from the plungers 44, and the ropes 50 reconnected if they were removed, whereupon the implement is ready for connection to a tractor and to be controlled therefrom manually. It is not necessary to remove the power control parts, but they may be removed, if desired, merely by taking out the pin 62 and then releasing the spring biased pins 111 from the forward end of the rear drawbar member 2, whereupon the support bar 61 and associated parts may be lifted away from the harrow. Figure 4 shows the position of the trip lever 41 when it is controlled manually. When the power control attachment is in place and the plungers 45 locked in inoperative positions, the trip levers 41 drop down into a position generally horizontal alongside the drawbar members, so as to be out of the way of any of the parts of the power control attachment. It is for the purpose of permitting the trip levers 41 to occupy low down positions that the openings 47 through which the levers 41 extend with a certain amount of looseness are formed considerably larger than the cooperating portions of the lever 41.

In the arrangement described above the piston and cylinder unit 70 is moved into an extended position when the harrow is shifted into an angled or operating position, and in order to vary the working angle of the disk gangs, the power unit 70 is actuated to extend or retract the piston 72 a slight amount. When the unit 70 is operated to bring the gangs into a straightened or transport position, and the harrow then subsequently brought into an angled position by again extending the unit 70, the latter is extended until the desired point is reached at which the gangs are angled the required amount. Under some conditions it may be desirable to employ a hydraulic piston and cylinder unit in which is incorporated an adjustable limit stop so that the power unit will always return to a given position. A unit of this kind may therefore be employed advantageously with a disk harrow controlling linkage described above, especially when arranged so that such adjustable limit stop may be employed to determine the angled position of the disk gangs when operating. One of such hydraulic power units with the above mentioned adjustable limit stop that is available incorporates an arrangement in which the adjustable stop limits the retracted position of the piston rod, and in order to employ such a power operated unit with the disk harrow angle control mechanism described above, certain modifications thereof may be necessary. Referring now to Figure 5, wherein I have shown a harrow control linkage quite similar to that shown in Figure 1 and employing a number of parts identical with those shown in Figure 1, but with certain modifications to accommodate the use of a fluid power unit having an adjustable limit stop for positively determining the extent of inward movement of the piston relative to the cylinder. Parts shown in Figure 5 which are identical with those shown in Figure 1 are indicated by the same reference numerals. In Figure 5, an arm 121 is pivoted on a pivot bolt 122 to the main bar or support 61, the pivot bolt 122 being somewhat longer than the corresponding pivot 82 shown in Figure 1. Also, the upper end 123 of the arm member or lever 121 is straight, instead of being angled as shown in Figure 1. The arm 121 is made up of two strap members 124 and 125 and connected at their lower ends to the slide 5 in substantially the same manner described above in connection with the part 81 shown in Figure 1. The upper end of each of the bars 124 and 125 is apertured to receive pivots 127 by which a pair of links 128 and 129 are pivotally connected thereto. The links 128 and 129 extend rearwardly and downwardly and are pivoted at 85 to the rear arm member or lever 83. Disposed on the relatively long pivot bolt 122 is a vertically extending arm 132, preferably made up of a pair of strap members 133 and 134 apertured to receive the pivot 122. The strap members 133 and 134 extend downwardly below the bar support 61 and are apertured to receive a pivot pin 136 by which the forward end of a link 137 is pivotally connected therewith. The forward end of the link 137 is disposed between the straps 133 and 134 making up the swinging arm member or lever 132 and is apertured to receive the pivot bolt or pin 136. The rear end of the link 137 has a forked section 138 which receives the link or lever 83 and is apertured to receive the pivot pin or bolt 85. The upper ends of the strap members 133 and 134 are bent so as to lie against one another and are apertured to receive the quick detachable pin 78 by which the piston rod 141 of a fluid power unit 142 may be connected thereto. The unit 142 includes the piston rod 141, a piston secured to the inner end thereof and movable in a cylinder 143, a pair of hose lines 144 and 145, and forms the means by which fluid may be delivered to one side of the piston, and withdrawn from the other side optionally. The cylinder 143 is also provided with adjustable limit stop mechanism indicated in its entirety by the reference numeral 147 and including a pair of bosses 150 through which a pair of parallel rods 151 are slidable. At the outer end of the cylinder 143 a transverse stop member 152 is connected rigidly to the end of the rods 151 and is apertured centrally to accommodate the piston rod 141. Each of the rods 151 is provided with a number of openings which are adapted to register with openings formed in the bosses 150. Quick detachable pins 155 are adapted to be inserted through the registering holes to dispose the stop member 152 in different positions outwardly of the cylinder 143 so that when the piston rod 151 is retracted, the head 156 carried at the outer end of the piston rod 141 comes into contact with the stop member 152, whereupon further retracting movement is prevented. Thus, by removing the pins 155 and shifting the stop member 152 to the desired point, the unit 142 may be removed from the harrow and replaced without losing the adjustment provided by the adjustable stop 147.

It will be seen from Figure 5 that, in the form of the invention shown in Figure 1 the power unit 70 is extended to angle the gangs, but in the form of the invention shown in Figure 5 the unit 142 is operated in the opposite direction, namely, retracted, to angle the gangs, and therefore the disposition of a limit stop on the retracted side of the unit 142 provides an adjustment for the angling of the gangs, which adjustment is not lost by the removal and reattachment of the power unit.

Mention was made above in connection with the form of the invention shown in Figure 1 that the power unit and supporting structure therefore may readily be disconnected from the harrow, placing the latter under the control of the cables 50. A harrow thus arranged for manual control is operated in substantially the same manner as the harrow shown in the United States Patent 1,941,504, issued January 2, 1934, to Charles H. White, in which the harrow can be angled and straightened while the outfit is moving forwardly. This is possible by virtue of the two latch units 30 and 31. Under certain conditions it may not be objectionable to be required to back the tractor to straighten the gangs, in which case only one latch unit is necessary. The harrow shown in Figure 5 may therefore be equipped with only one latch unit 31, the forward latch unit 30 of Figure 1 being replaced by a simple connection for connecting and disconnecting the slide 5 more or less permanently to the forward end of the drawbar member 3. More specifically, and as shown in Figure 5, the slide 5 in this form of the invention is provided with a bracket 161 having an aperture therein to receive a pin 162 connected to the bracket by a chain 163. The upper plate 10 of the slide 5 has an opening 164 to receive the pin 162, for locking the slide to the forward portion of the drawbar member 3, as by removing the pin 162 from the upper opening in the bracket 161 and dropping through the opening in the slide plate 10 and the forwardmost opening 24 in the drawbar 3, after the harrow has been angled, bringing the slide 5 into a forward position corresponding to that shown in Figure 1. When the pin 162 is thus disposed, the slide 5 is locked to the drawbar 3 in a forward position and, with the power operating mechanism removed, the harrow is controlled by operating the latch unit 31 in connection with forward and rearward movement of the tractor.

While I have shown and described above the preferred structure in which the principles of the present invention have been incorporated, it is to be understood that my invention is not to be limited to the particular details shown and described about, but that, in fact, widely different means may be employed in the practice of the broader aspects of my invention.

What I claim, therefore, and desire to secure by Letters Patent is:

1. In a disk harrow having a drawbar and a part slidable relative thereto, a rigid member pivoted to the forward end of said drawbar, a lever pivoted to said rigid member and connected at one end with said slidable part, and a power unit supported at one end on said rigid member and at the other end on the other end of said lever.

2. In a disk harrow having a draft-receiving drawbar member, a part slidable relative thereto, a rigid member pivotally connected at its forward end with said drawbar member, an arm pivotally connected with the rear end of said rigid member and at its lower end pivotally connected with said slidable part, a power unit including a piston and cylinder device, means connecting the forward end of said device with the forward portion of said rigid member, and means connecting the rear portion of said device with said pivoted arm.

3. A disk harrow convertible from power control to manual control, comprising a pair of disk gangs, a hitch construction comprising a rear drawbar member connected with the inner ends of said gangs, a forward draft-receiving drawbar member slidably associated with said rear drawbar member, a part slidable on said front drawbar member and connected with the outer ends of said gangs, a pair of levers connected, respectively, with said rear drawbar member and said slidable part, a rigid member detachably connected at its forward end with the forward portion of said front drawbar member and pivotally receiving said levers, and a power unit connected between said rigid member and said levers for shifting the latter in opposite directions, said rigid member being supported at its forward end on the forward portion of said front drawbar member and at its rear end through the rear lever on the forward end of said rear drawbar member, the other lever having generally vertically shiftable connection with said slidable part.

4. In a disk harrow having a drawbar construction comprising a rear drawbar member, a forward drawbar member slidably associated therewith, a slide movably mounted on said forward drawbar member, a first latch unit on said slide for optionally locking said slide with said forward drawbar member, a second latch unit mounted on the rear drawbar member for connecting the latter with said forward drawbar member, and means for holding each of said latch units in inoperative position to accommodate relatively free movement of said slide and drawbar members; a power control attachment comprising a supporting member adapted to be supportingly mounted on the forward end of said forward drawbar unit, a pair of relatively movable members pivotally connected with said supporting member, means pivotally connecting said members, respectively, with said slide and said rear drawbar member, a power unit connected with said relatively movable members for swinging them in opposite directions, and means for supporting said power unit on said supporting member.

5. In a disk harrow having a pair of relatively shiftable drawbar members, a shiftable slide on one of said members, and means connecting the slide and the other drawbar member with the disk gang or gangs of said harrow: a power control attachment comprising a supporting member having a forward end, means for mounting the forward end of said supporting member on said one drawbar member, a pair of relatively movable parts pivotally connected with said support member, means carried at least in part on said parts for connecting said parts, respectively, with said other drawbar member and said slide, the part connected with said other drawbar member serving to carry said supporting member, and a power operated unit mounted on said supporting member and connected with said relatively movable parts for shifting them in opposite directions, relative to said one drawbar member.

6. In a disk harrow having a generally transversely arranged gang swingable in a normally horizontal plane, a hitch construction including a part adapted to receive draft from a tractor or other source of power, a pair of members movable relative to said draft-receiving part and connected with opposite end portions of said gang, and a gang controlling unit including a supporting member pivoted adjacent its forward end to said part and connected supportingly at its other end on one of said members, and means on said supporting member and connected with said pair of members for shifting them in opposite directions relative to said part.

7. The invention set forth in claim 6, further characterized by said shifting means including a power unit in the form of a piston and cylinder device, and an adjustable limit stop on said power unit for limiting the movement of the piston thereon in one direction.

8. In a disk harrow, a forward drawbar member adapted to receive draft, a pair of relatively movable parts associated with said drawbar member, a rigid supporting member connected at one end with said drawbar member, a pair of arms pivoted to said rigid member and connected, respectively, with said relatively movable parts, means interconnecting said arms so that when one is swung in one direction the other is swung in the other direction, a motion reversing linkage connected with one of said arms, and means carried by said rigid member and connected with said motion reversing linkage for swinging said arms in opposite directions for changing the angle of the disk gang of the harrow.

9. In a disk harrow having a pair of relatively slidable, front and rear drawbar members, the rear member being connected with the inner end of the disk gang, and a slide movably mounted on the front drawbar member and connected with the outer end of the associated disk gang: a power angling attachment comprising a rigid supporting member adapted to be disposed generally longitudinally of said drawbar members, means for pivotally connecting the forward end of said supporting member to the forward end of said front drawbar member, a pair of generally vertically disposed arms pivotally connected with said rigid member in fore and aft spaced relation, means interconnecting said arms whereby when one is moved in one direction the other is moved in the opposite direction, means pivotally connecting the lower end of the rear arm to said rear drawbar member, means providing a pivotal connection between the lower end of the other arm and said front drawbar member, and a power unit mounted on said rigid member and connected to swing said arms in opposite directions for changing the angle of said disk gang by shifting said slide and rear drawbar member in generally opposite directions.

10. In a disk harrow, a forward drawbar member adapted to receive draft, a pair of relatively movable parts associated with said drawbar member, a rigid supporting member connected at one end with said drawbar member, a pair of arms pivoted to said rigid member and connected, respectively, with said relatively movable parts, means interconnecting said arms so that when one is swung in one direction the other is swung in the other direction, and means carried by said rigid member and connected with one of said pivoted arms for swinging said arms in opposite directions for changing the angle of the disk gang of the harrow.

11. In a disk harrow having a draft-receiving drawbar member, a pair of parts slidable relative thereto, a rigid member pivotally connected at its forward end with said drawbar member, an arm pivotally connected with the rear end of said rigid member and at its lower end pivotally connected with one of said slidable parts, a second arm pivotally connected with said rigid member forwardly of said first mentioned arm, motion-reversing means interconnecting said arms, means pivotally connecting said second arm with the other of said pair of slidable parts, a power unit including a piston and cylinder device, means connecting the forward end of said device with the forward portion of said rigid member, and means connecting the rear portion of said device with one of said arms.

12. In a disk harrow having a draft-receiving drawbar member and a pair of parts slidable relative to said drawbar member, the improvement comprising a rigid member adapted to be pivotally connected at its forward end with said drawbar member, an arm pivotally connected with the rear end of said rigid member and adapted to be pivotally connected at its lower end with one of said slidable parts, a second arm pivotally connected with said rigid member forwardly of said first mentioned arm, means for pivotally connecting said second arm with the other of said pair of slidable parts, motion-reversing means interconnecting said arms, a power unit including a piston and cylinder device, means connecting the forward end of said device with the forward portion of said rigid member, and means connecting the rear portion of said device with one of said arms.

CHARLES H. YOUNGBERG.

REFERENCES CITED

The following references are of record in the file of this patent:

UNITED STATES PATENTS

| Number | Name | Date |
|---|---|---|
| Re. 22,225 | Hornish | May 27, 1942 |
| 1,748,393 | Peterson | Feb. 25, 1930 |
| 1,872,108 | Bopf | Aug. 16, 1932 |
| 2,143,193 | Goble | Jan. 10, 1939 |
| 2,174,493 | Vanderwerf | Sept. 26, 1939 |
| 2,318,275 | White | May 4, 1943 |
| 2,338,698 | White | Jan. 11, 1944 |
| 2,470,008 | White et al. | May 10, 1949 |